United States Patent
Cadarette et al.

(10) Patent No.: US 7,108,623 B2
(45) Date of Patent: Sep. 19, 2006

(54) FAN IDLER PULLEY

(75) Inventors: Marc R. Cadarette, London (CA); Yahya Hodjat, Oxford, MI (US); Michel Ozorak, St. Thomas (CA); Hao Tran, Windsor (CA)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/189,753

(22) Filed: Jul. 2, 2002

(65) Prior Publication Data

US 2003/0008743 A1    Jan. 9, 2003

Related U.S. Application Data

(60) Provisional application No. 60/303,620, filed on Jul. 6, 2001.

(51) Int. Cl.
*F16H 7/20*    (2006.01)
*F16H 55/36*    (2006.01)

(52) U.S. Cl. ..................... 474/199; 474/166

(58) Field of Classification Search ............... 474/148, 474/149, 150, 152, 166, 199, 182, 174, 170; 384/537, 543, 546, 547

See application file for complete search history.

(56) References Cited

U.S. PATENT DOCUMENTS

| | | | | |
|---|---|---|---|---|
| 4,068,907 | A | | 1/1978 | Zenthoefer ............... 308/18 |
| 4,665,766 | A | | 5/1987 | Umeha et al. ............ 74/567 |
| 4,917,529 | A | * | 4/1990 | Hishida .................. 403/259 |
| 5,026,253 | A | * | 6/1991 | Borger ................... 415/229 |
| 5,195,241 | A | * | 3/1993 | Bradfield ................ 29/892 |
| 5,779,579 | A | | 7/1998 | Miyagi et al. ............ 474/72 |
| 5,947,853 | A | * | 9/1999 | Hodjat et al. ........... 474/166 |
| 6,019,693 | A | * | 2/2000 | Ban et al. ............... 474/150 |
| 6,200,089 | B1 | * | 3/2001 | Heer .................... 415/168.2 |
| 6,200,221 | B1 | * | 3/2001 | Maejima et al. ........ 464/45 |
| 6,293,885 | B1 | * | 9/2001 | Serkh et al. ............ 474/199 |
| 6,336,883 | B1 | * | 1/2002 | Bevc et al. ............. 474/166 |
| 6,500,085 | B1 | * | 12/2002 | Kawachi ................. 474/199 |
| 2004/0009836 | A1 | * | 1/2004 | Dix et al. .............. 474/135 |

FOREIGN PATENT DOCUMENTS

DE    10033607    *    7/2000

* cited by examiner

*Primary Examiner*—Vicky A. Johnson
(74) *Attorney, Agent, or Firm*—J. A. Thurnau, Esq.; C. H. Castleman, Esq.; J. L. Mahurin, Esq.

(57) ABSTRACT

A fan idler pulley having a threaded hub for attaching a fan shaft. The pulley also comprises a receiving portion for engaging a bearing. The bearing is further engaged with a cup. The entire assembly is mounted by a pin press fit though the cup into a mounting surface such as an engine block or front cover. The pulley may be engaged to either the inner race or the outer race of the bearing.

7 Claims, 5 Drawing Sheets

FAN IDLER PULLEY

REFERENCE TO RELATED APPLICATIONS

This application claims priority from U.S. provisional application Ser. No. 60/303,620 filed Jul. 6, 2001.

FIELD OF THE INVENTION

The invention relates to fan idler pulleys, more particularly, to fan idler pulleys having a threaded fan shaft receiving hub and a bearing receiving portion.

BACKGROUND OF THE INVENTION

In automotive accessory drive systems a fan pulley is used to drive a clutch/fan assembly which is attached to the fan pulley. Typically, this fan pulley is attached by being pressed onto a spindle type bearing assembly which also drives a water pump. The spindle type bearings are very expensive.

Representative of the art is U.S. Pat. No. 5,779,579 (1998) to Miyagi et al. which discloses a pulley assembly for a driven shaft.

What is needed is a fan idler pulley configured to receive a ball bearing. What is needed is a fan idler pulley having a hub with a central hole and a hub portion for engaging a bearing race. What is needed is a fan idler pulley having a cup for receiving the bearing and mounting the pulley to a mounting surface. What is needed is a fan idler pulley having a threaded hub for attaching a fan shaft. The present invention meets these needs.

SUMMARY OF THE INVENTION

The primary aspect of the invention is to provide a fan idler pulley configured to receive a ball bearing.

Another aspect of the invention is to provide a fan idler pulley having a hub with a central hole and a hub portion for engaging a bearing race.

Another aspect of the invention is to provide a fan idler pulley having a cup for receiving the bearing and mounting the pulley to a mounting surface.

Another aspect of the invention is to provide a fan idler having a threaded hub for attaching a fan shaft.

Other aspects of the invention will be pointed out or made obvious by the following description of the invention and the accompanying drawings.

The invention comprises a fan idler pulley having a threaded hub for attaching a fan shaft. The pulley also comprises a receiving portion for engaging a bearing. The bearing is further engaged with a cup. The entire assembly is mounted by a pin press fit through the cup into a mounting surface such as an engine block or front cover. The pulley receiving portion may be engaged to either the inner race or the outer race of the bearing.

DETAILED DESCRIPTION OF THE PREFERRED EMBODIMENT

Figure 1:
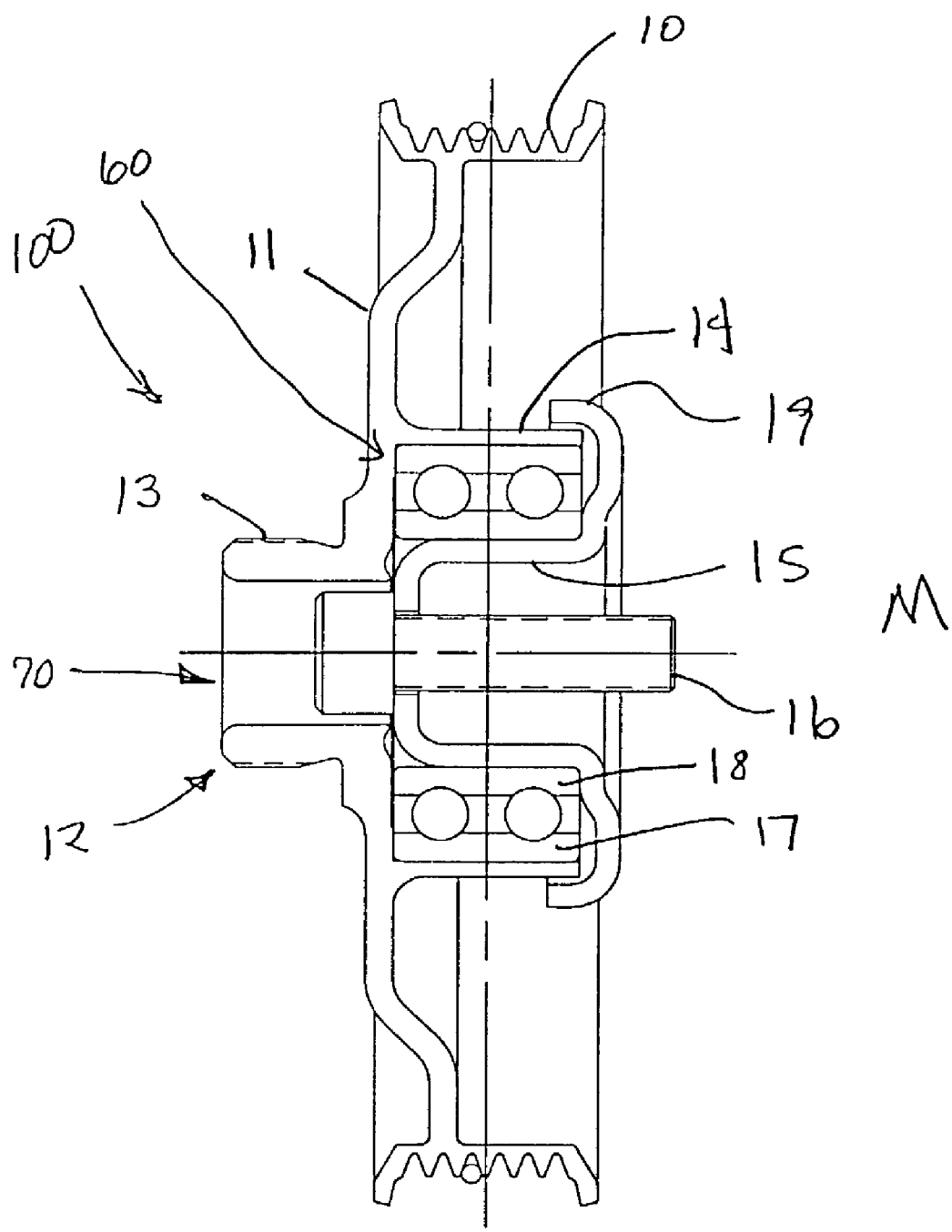
FIG. 1 is a cross-sectional view of the inventive pulley.

FIG. 1 is a cross-sectional view of the inventive pulley. Pulley 100 comprises cylindrically shaped belt bearing surface 10 connected to web 11. Belt bearing surface 10 engages a power transmission belt of the type known in the art. Surface 10 has a multi-ribbed profile in the preferred embodiment, but may have the profile of any belt used in the art, including but not limited to flat, toothed or v-belt shape. Hub 13 is connected to web 11. Outer cylindrical surface of hub 12 is threaded 13. A fan shaft is attached to threaded portion 13 in the preferred embodiment, see FIG. 4.

Inner collar or cylindrically shaped receiving portion 14 engages bearing outer race 17. Receiving portion 14 is opposite hub 12 and hub surface 13. Outer race 17 is press fit into receiving portion 14.

Bearing 60 comprises a paired ball bearing or double row angular contact type bearing. Each is significantly less expensive that the spindle type bearings used in the prior art, see FIG. 5.

Bearing cup 15 engages an inner race 18 of bearing 60. Inner race 18 is press fit into cup 15. Bearing cup 15 may further comprise lip 19 to prevent debris from contaminating bearing 60.

In the preferred embodiment a fastener 16 comprising a pin fastens cup 15 to a mounting surface M by a press fit. Mounting surface M may comprise an engine block. Hub 12 describes central hole 70 through which pin 16 passes. Fastener 16 may also comprise a threaded fastener for engaging a threaded hole in the mounting surface.

Figure 2:
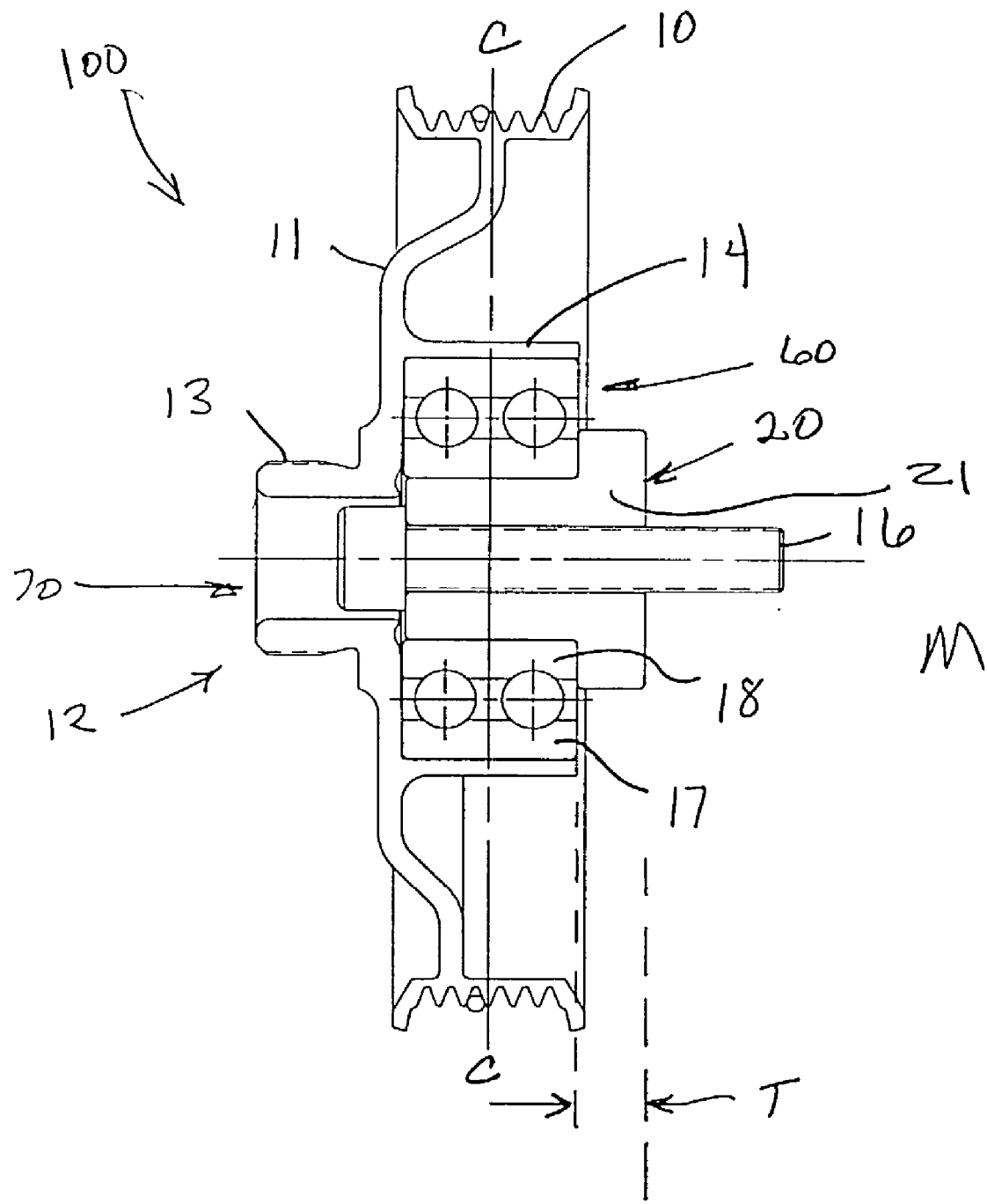
FIG. 2 is a cross-sectional view of an alternate mounting arrangement.

FIG. 2 is a cross-sectional view of an alternate mounting arrangement. Spacer 20 is press fit into bearing inner race 19. Fastener 16 is then press fit into a mounting surface M. Spacer 20 comprises collar 21 having a thickness T. Thickness T is selected so that a belt bearing surface centerline C—C aligns as required by a user.

Figure 3:
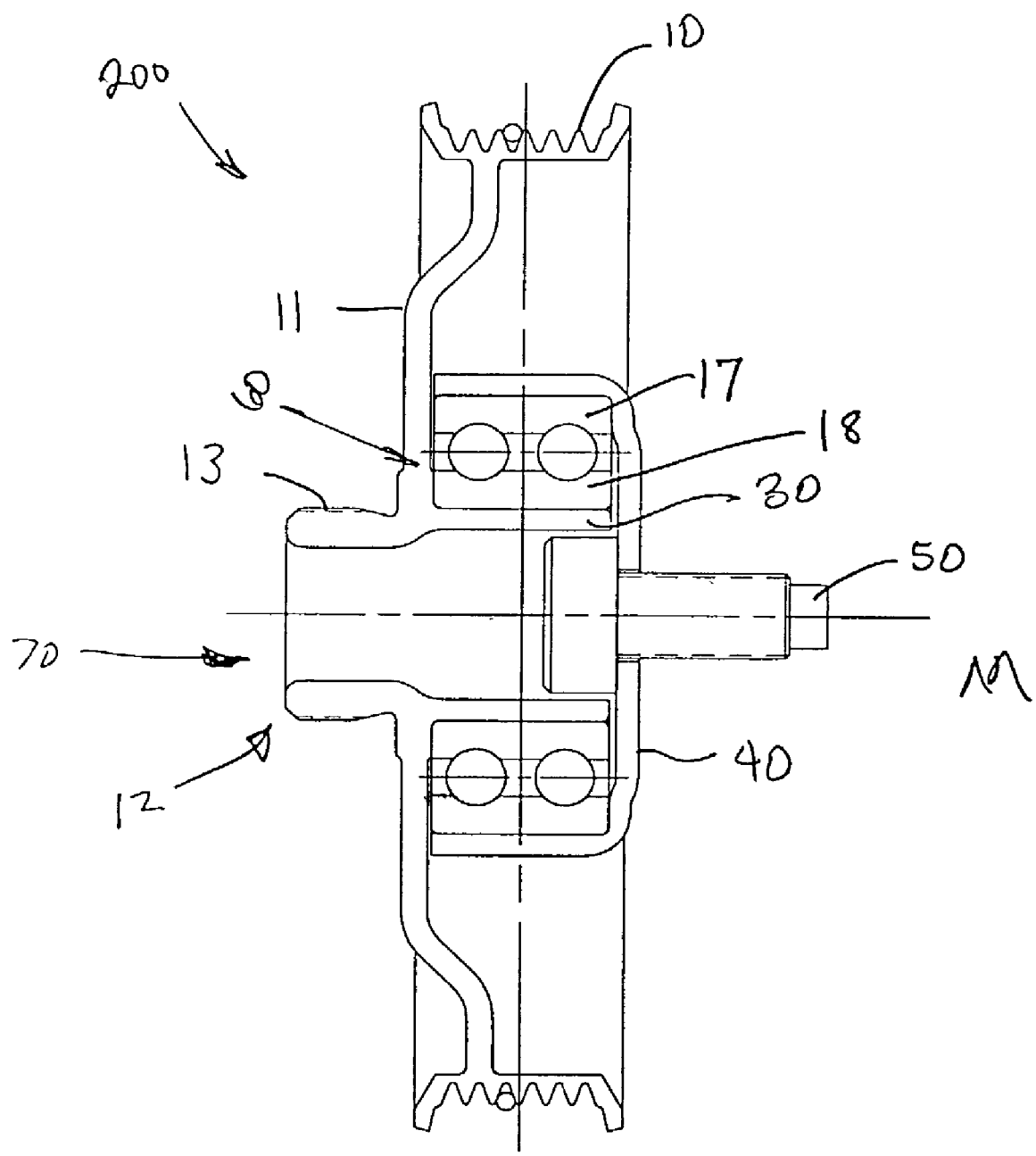
FIG. 3 is a cross-sectional view of another alternate embodiment.

FIG. 3 is a cross-sectional view of another alternate embodiment. Pulley 200 comprises belt bearing surface 10 connected to web 11. Connected to web 11 to hub 12. An outer surface 13 of hub 12 is threaded. A fan shaft is attached to the threaded portion 13, see FIG. 4.

Inner collar 30 or cylindrical receiving portion 30 engages bearing inner race 18. Bearing cup 40 engages an outer race 17 of a bearing. Receiving portion 30 is press fit into inner race 18. Outer race 17 is press fit into cup 40.

Fastener 50 comprises a pin that fastens cup 40 to a mounting surface M by a press fit. Fastener 50 may also comprise a threaded fastener for engaging a threaded hole in the mounting surface.

Figure 4:
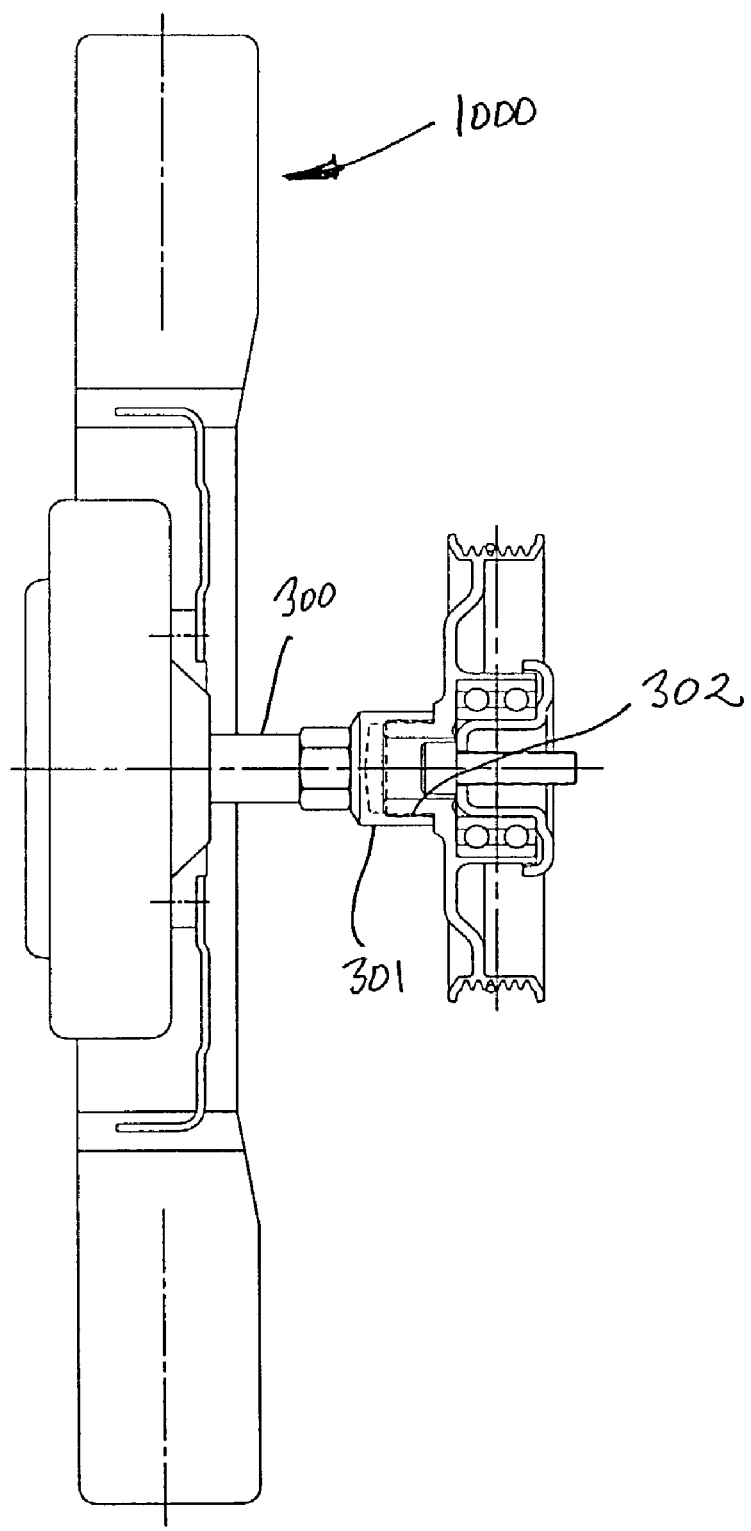
FIG. 4 is a cross-sectional view of the inventive pulley with a fan shaft attached.

FIG. 4 is a cross-sectional view of the inventive pulley with a fan shaft attached. Fan 1000 is connected to a fan shaft 300. Fan shaft 300 comprises fastener 301. Fastener 301 comprises a threaded inner surface 302 which threadably engages hub outer surface 13. This method of fastening fan shaft 300 to hub 12 by threaded connection is used for each of the embodiments shown in FIGS. 1, 2, and 3.

The inventive pulley allows fan shaft 300 to be bolted to the hub 12 instead of being press fit into a pulley having a spindle bearing. This causes the fan idler assembly process to comprise pressing the pulley and pin into a mounting surface. The fan shaft is then bolted to the hub.

This is method is significantly simpler than the prior art wherein the fan shaft is first press fit into the idler pulley and the idler pulley and fan are mounted to a mounting surface. The prior art method requires greater space to attach the larger fan/idler pulley assembly. The instant invention allows the pulley to be mounted first, separately from a fan. The fan can then simply be bolted to the fan idler pulley at a different, later step in an engine assembly process. This simplifies the assembly process while reducing the cost of materials by use of less expensive bearings.

Figure 5:
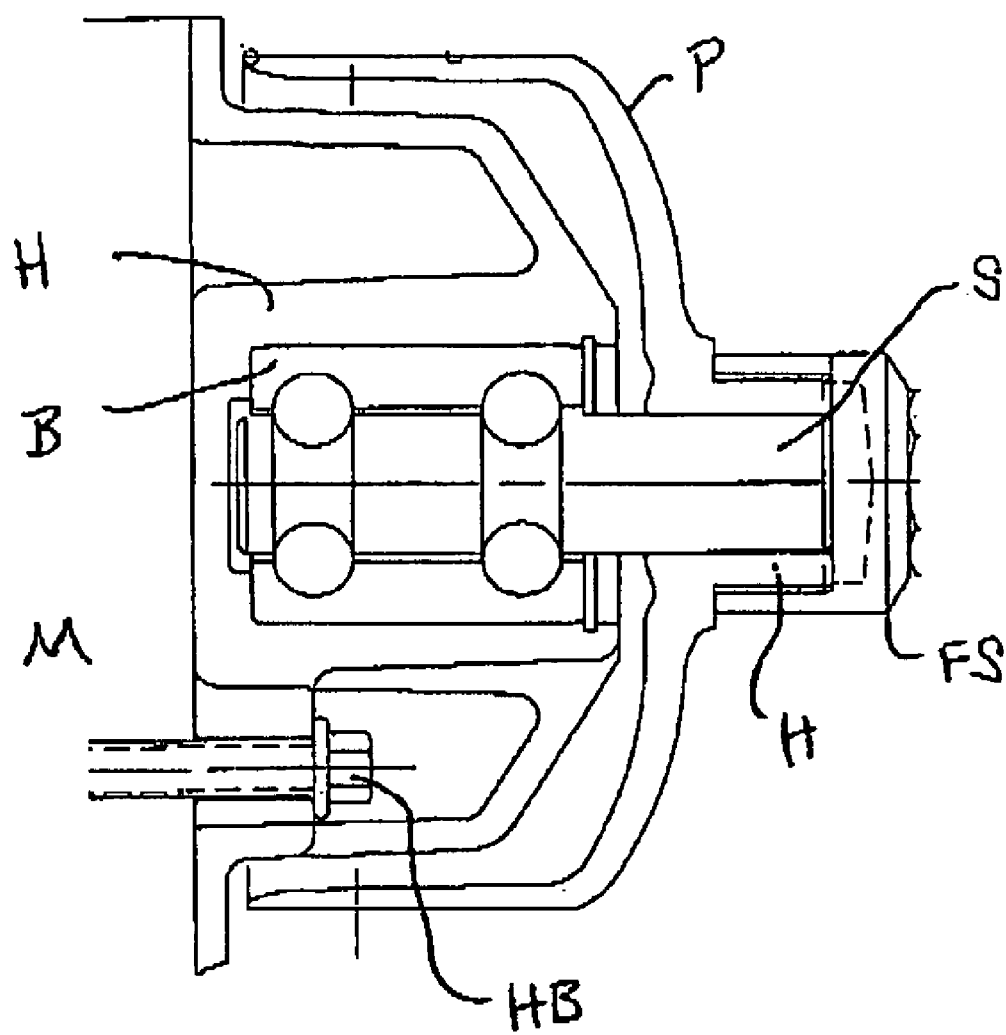
FIG. 5 is a cross-sectional view of a prior art pulley.

FIG. 5 is a cross-sectional view of a prior art pulley. Pulley P is press fit to shaft S. Spindle bearing B is press fit into housing H. Shaft S is engaged with the inner race of spindle bearing B. Housing H is bolted to mounting surface M using bolt HB. Fan shaft FS is bolted to hub H of pulley P.

Although a form of the invention has been described herein, it will be obvious to those skilled in the art that variations may be made in the construction and relation of parts without departing from the spirit and scope of the invention described herein.

We claim:

1. A pulley assembly comprising:
   a belt bearing surface;
   a fan shaft engaged with the hub surface;
   a web connecting the belt bearing surface to a hub;
   the hub having a hub surface for engaging a shaft;
   the hub surface describing a central hole;
   a receiving portion opposite the hub, the receiving portion engageable with a bearing first race;
   a cup for receiving a bearing second race; and
   a fastener engaged through the central hole for attaching the cup to a mounting surface.

2. The pulley assembly as in claim 1 further comprising a shaft attached to the hub surface.

3. A pulley assembly comprising:
   a belt bearing surface;
   a web connecting the belt bearing surface to a hub;
   the hub having a threaded hub surface for engaging a shaft;
   a fan shaft engaged with the hub surface;
   the hub describing a central hole extending through the hub;
   a receiving portion opposite the hub on the web, the receiving portion engageable with a bearing first race;
   a cup for receiving a bearing second race; and
   the cup is attachable to a mounting surface.

4. The pulley assembly as in claim 3 further comprising a shaft attached to the hub surface.

5. The pulley assembly as in claim 3, wherein the bearing first race is an outer bearing race.

6. The pulley assembly as in claim 3, wherein the bearing first race is an inner bearing race.

7. The pulley assembly as in claim 3 wherein the bearing comprises a ball bearing.

* * * * *